United States Patent [19]

Morioka et al.

[11] Patent Number: 4,716,076

[45] Date of Patent: Dec. 29, 1987

[54] MAGNETIC RECORDING MEDIUM

[75] Inventors: Akira Morioka; Takeshi Matsuura, both of Kyoto; Yoshiyuki Takahira, Suita, all of Japan

[73] Assignee: Hitachi Maxell, Ltd., Osaka, Japan

[21] Appl. No.: 743,679

[22] Filed: Jun. 11, 1985

[30] Foreign Application Priority Data

Jun. 13, 1984 [JP] Japan ............................... 59-120948

[51] Int. Cl.4 .................. G11B 5/706; G11B 5/708
[52] U.S. Cl. ................................... 428/323; 427/128; 428/329; 428/694; 428/900; 428/336
[58] Field of Search ............... 428/694, 900, 323, 329, 428/336; 427/128; 252/62.54, 62.56

[56] References Cited

U.S. PATENT DOCUMENTS

| 4,316,927 | 2/1982 | Kimura et al. | 428/694 |
|---|---|---|---|
| 4,435,485 | 3/1984 | Nakajima et al. | 428/694 |
| 4,439,486 | 3/1984 | Yamada et al. | 428/694 |
| 4,500,599 | 2/1985 | Ogawa et al. | 428/694 |
| 4,539,257 | 9/1985 | Ryoke et al. | 428/694 |
| 4,551,386 | 11/1985 | Yamaguchi et al. | 428/694 |

Primary Examiner—Paul J. Thibodeau
Attorney, Agent, or Firm—Birch, Stewart, Kolasch & Birch

[57] ABSTRACT

Magnetic recording medium having a magnetic layer in which magnetic powder of the magnetic layer includes iron oxide magnetic powder with more than 30 $m^2/g$ specific surface area measured by BET method, chromium dioxide ($CrO_2$) magnetic powder with more than 30 $m^2/g$ specific surface area measured by BET method, and the rate of the chromium dioxide powder is within a range more than 3% to less than 20% by weight in the total amount of the magnetic powder in the magnetic powder. Said magnetic layer further includes carbon black.

7 Claims, No Drawings

MAGNETIC RECORDING MEDIUM

FIELD OF THE INVENTION

The present invention relates to a magnetic recording medium having a high light preventive property.

BACKGROUND OF THE INVENTION

In recent magnetic recording devices, methods have been devised to make the recording wave short and the track width narrow for a high recording density. In particular, video tape recorders have been proposed in enabling the remarkably high density recording.

Corresponding to the progress in the video tape recorder, there have been desired in a recording medium to improve the electro-magnetic conversion characteristics of a recording medium such as reproducing output, S/N ratio for obtaining clear picture quality and/or a high fidelity sound recording.

In order to improve the electro-magnetic conversion characteristics of a video tape, as the magnetic agents contained in the magnetic layer of the magnetic tape, there have been used, agents, such as magnetic powder of fine particles having a specific surface area more than 30 m$^2$/g, measured by a BET method.

As the magnetic powder of the kind mentioned above, ferrous magnetic powder, such as $\gamma$-FeO$_3$ and cobalt containing $\gamma$-Fe$_2$O$_3$, which is able to record and reproduce with a suitable remanence, may be generally be used and in fact a good electro-magnetic conversion characteristic can be obtained.

However, since the ferrous magnetic powder is brown or light brown in color, when the powder is contained in the magnetic layer of the recording tape with a specific surface area of more than 30 m$^2$/g, the recording tape is characterized with an inferior light shielding property in the magnetic layer.

Therefore, in a case where such a magnetic tape is used in a VHS type video tape recorder, in which an end of the tape is detected by an optical means is employed, there tends to occur an erroneous operation due to a high light transmittance of the recording tape.

In order to avoid this error, when a large amount of carbon black is contained in the magnetic layer, the electro-magnetic conversion characteristic and abrasion resistance may be harmed.

A video recording tape using chromium dioxide (CrO$_2$) magnetic powder having specific surface area of more than 30 m$^2$/g measured by BET nitrogen method, has drawbacks. These being that the tape has a large surface roughness, a low electromagnetic conversion characteristic and there is a low abrasive resistance of the magnetic layer due to a low dispersibility of the CrO$_2$ powder in the magnetic coating material.

OBJECT OF THE INVENTION

Therefore, an essential object of the present invention is to provide a magnetic recording medium having a good electro-magnetic conversion characteristic with a low light transmittance and a high abrasion resistance.

SUMMARY OF THE INVENTION

As a result of a study of the magnetic recording medium for decreasing light transmittance of the magnetic layer using iron magnetic powder of more than 30 m$^2$/g specific surface area measured by BET method, the inventor has found that the light transmittance of the magnetic layer can effectively be decreased keeping an excellent electro-magnetic conversion characteristic and high abrasion resistance of the magnetic layer by the layer having contained therein, chromium dioxide (CrO$_2$) magnetic powder of 30 m$^2$/g specific surface area measured by BET method of a predetermined amount in iron oxide magnetic powder.

With chromium dioxide magnetic powder being more than 20% by weight of the total amount of both of the magnetic powder compositions, the roughness of the magnetic layer becomes large, thereby lowering the electro-magnetic conversion characteristic and abrasion resistance. Accordingly, the amount of the chromium dioxide magnetic powder must be in the range lower than 20% to 3% by weight for decreasing the light transmittance.

In Japanese Patent Publication No. 26528/1980, there is proposed a magnetic recording medium with the magnetic layer composed of iron oxide magnetic powder and chromium dioxide magnetic powder of more than 20% and less than 80% by weight so as to improve the surface roughness of the magnetic layer and a squareness ratio thereof.

However, with the amount of the chromium dioxide magnetic powder being more than 20% by weight, the surface roughness of the magnetic layer, the electromagnetic conversion characteristic and abrasion resistance become unsatisfactory compared to the recording medium using single iron oxide as already mentioned.

Further, as already mentioned, the present inventor found that the light transmittance of the magnetic layer can be decreased by adding a predetermined amount of chromium dioxide powder to the iron oxide powder. However, there still remains the problem that electromagnetic conversion characteristic is unsatisfactory compared to the recording medium using simple iron oxide powder as the magnetic coating material.

The present inventor has studied to eliminate the drawback, and has found that the roughness of the surface of the magnetic layer can be decreased by adding a predetermined amount of carbon black with more than 3% of volatile constituent in the magnetic powder in which iron oxide and chromium dioxide (CrO$_2$) are contained. As a result of the addition, the electro-magnetic conversion characteristic can be kept to the degree which was obtained in the magnetic recording medium using the simple iron oxide magnetic powder without lowering the abrasion resistance.

Although the reason why the properties as mentioned above are improved is not clear, it is considered that since the carbon black of which volatile constituent is more than 3%, contains a large amount of an oxygen containing group such as carboxyl group, quinone group, phenol group or lactone group, the dispersibility thereof in the magnetic paint is good compared to the content of the carbon black in which the volatile constituent is small and used as the anti-static additive. In addition, the oxygen containing group progresses the wetting action of the particles of the iron oxide magnetic powder and the particles of the chromium dioxide (CrO$_2$) powder in the magnetic paint. Thus, the yielding value of the magnetic paint can be lowered, resulting in an improvement of the flowage of the paint. Therefore, since the dispersing property of the magnetic paint can be improved, the surface roughness of the magnetic layer can be decreased accordingly, this causes the electro-magnetic conversion characteristic to be improved.

The present invention is based on the aforementioned knowledge.

According to the present invention, there is provided a magnetic recording medium which comprises a magnetic layer formed by magnetic powder composed of iron oxide powder with more than 30 m²/g specific surface area measured by nitrogen BET method and chromium dioxide ($CrO_2$) powder with more than 30 m²/g specific surface area by BET method and the amount of the chromium dioxide powder is more than 3% and less than 20% by weight in the total amount of the iron oxide powder and chromium dioxide powder, said magnetic powder further comprises carbon black of which volatile constituent is more than 3% by weight.

In the preferred embodiment of the magnetic recording medium according to the present invention, as the iron oxide system magnetic powder having more than 30 m²/g specific surface area, $\gamma$-$Fe_2O_3$ or $Fe_3O_4$ intermediates thereof or compound to which one or more of metals of Co, Ni Cr Mn or Zn are doped thereto, may be used.

As the chromium dioxide ($CrO_2$) magnetic powder, the powder having a specific surface area in a range of 30 to 60 m²/g may preferably be used.

In the present invention, as the magnetic material, a mixture of the iron oxide system magnetic powder and chromium dioxide magnetic powder is used and the amount of the chromium dioxide ($CrO_2$) magnetic powder is preferably in a range of more than 3% and less than 20% by weight in the total amount of the mixture and more preferably the amount of the chromium dioxide ($CrO_2$) magnetic powder may be in the range of more than 5% to 15% by weight. With the amount of chromium dioxide ($CrO_2$) magnetic powder being less than 3% by weight, the light transmittance of the magnetic material is too large, so that an error may occur in the detection of the tape end, when the tape end is detected by light, while with the chromium dioxide magnetic powder more than 20% by weight the surface roughness of the magnetic layer becomes large due to inferiority of dispersibility of the iron oxide magnetic powder and therefore, electro magnetic conversion characteristic may be unsatisfactory.

The volatile constituent in carbon black is a component caused by an oxygen containing group such as carboxyl group, quinone group, phenol group and lactone group and the greater the amount of the volatile constituent, the better the dispersibility of the carbon black and the magnetic powder as a magnetic material. Therefore the degree of the improvement of the electromagnetic conversion characteristic may be remarkable. In view of the above, the maximum amount of the volatile constituent may preferably be 10% by weight. With the volatile constituent being less than 3% by weight a sufficient improvement of the electromagnetic conversion characteristic can not be expected.

The average particle size of the carbon black with the volatile constituent being more than 3% by weight is preferably within the range of 10 to 70 m$\mu$. The amount of the carbon black in the magnetic layer may preferably be within a range of 1 to 10 parts by weight for the total amount 100 parts by weight of the iron ozide system magnetic powder and the chromium dioxide magnetic powder. In case where the amount of the carbon black is too small, the electro-magnetic conversion characteristic is unsatisfactory, while in case where the amount of the carbon black is too great, the roughness of the magnetic layer becomes large, whereby the abrasion resistance and electro-magnetic conversion characteristic may be harmed.

As an example of the carbon black, BLACK PEARS-L, (trade name) manufactured by CABOT Corporation, RAVEN 1255 or RAVEN 3500 (trade name) manufactured by Columbian Carbon corporation, may be used.

The magnetic recording medium according to the present invention may be produced according to a conventional process. After preparing the magnetic paint which comprises the magnetic material, as mentioned above, and the binder and carbon black with the volatile constituent more than 3.0% by weight, the magnetic paint is coated on a substrate, such as a polyester film, dried and processed by a calender process.

As the binder, various conventional binders, which are known as binders for producing magnetic recording medium, may be used. For example binders, such as vinyl chloride resin, cellulose resin, polyurethane resin, polyester resin, acryl resin, rubber and/or isocyanate compound, may be used.

Various conventional additives, such as abrasive material of $Al_2O_3$, $Cr_2O_3$, or $\alpha$-$Fe_2O_3$, various lubricants, such as fatty acid, ester of fatty acid, silicon group resin, and fluorine group lubricants, may be added to the magnetic material, as desired.

The magnetic layer, using the magnetic powder as mentioned above, is formed in the magnetic recording medium with a thickness of 3 to 10 $\mu$m. In order to improve the running stability of the magnetic recording tape, a back coating layer may be formed on the opposite side of the recording tape.

It an advantage of the magnetic recording medium according to the present invention, that the dispersibility of carbon black can be improved, whereby the roughness of the surface of the magnetic layer can be made fine and the electro-magnetic conversion characteristic can be improved, and a further advantage, that a high abrasion resistance can be obtained.

It is a yet further advantage of the magnetic recording medium, according to the present invention, that the light transmittance can be decreased, so that various errors, caused by an undesired light transmittance through the recording medium, can be eliminated.

It is a still a further advantage of the magnetic recording medium, according to the present invention, that the remanence may be increased by using a chromium dioxide ($CrO_2$) magnetic powder.

It is a still further advantage of the magnetic recording medium, according to the present invention, that the surface electric resistivity may be decreased, since the carbon black contained in the magnetic layer serves to lower the electric resistivity in the magnetic layer.

EXAMPLE 1

Magnetic composition composed of the components described below were prepared.

| | |
|---|---|
| Cobalt containing $\gamma$-$Fe_2O_3$ (specific surface area 40 m²/g, coercive force 650 oersted) | 90 parts by weight |
| $CrO_2$ (specific surface area 37 m²/g coercive force 550 oersted) | 10 parts by weight |
| carbon black (volatile constituent 5.0% by weight average particle size 24 m$\mu$) | 5.5 parts by weight |
| particle $Fe_2O_3$ (average particle size 1.0 $\mu$m) | 5.0 parts by weight |

| | |
|---|---|
| Cr$_2$O$_3$ (average particle size 1.0 μm) | 0.8 parts by wieght |
| Al$_2$O$_3$ (average particle size 0.4 μm) | 2.0 parts by weight |
| zinc stearate | 0.5 parts by weight |
| nitrocellulose (H ½ second type 16% by weight solvent of cyclohexanone/toluene) | 56 parts by weight |
| cyclohexanone | 90 parts by weight |
| toluene | 90 parts by weight |

Composition defined as above was mixed by a mixer for 5 to 10 hours and dispersed in a sand mil. Subsequently, the composition was mixed with additional composition defined as below by a high speed mixer. The mixture was filtered using 1 μm pass filter, then the magnetic paint was obtained.

| | |
|---|---|
| polyurethane resin (20% by weight of cyclohexanone/toluene solvent) | 40 parts by weight |
| trifunctional low molecular isocyanite (75% ethyl acetate solvent) | 4 parts by weight |
| stearic acid n-butyl | 1 parts by weight |
| myristic acid | 2 parts by weight |
| cyclohexanone | 40 parts by weight |
| toluene | 40 parts by weight |

The magnetic paint was coated with 5 μm thick when dried on a polyester film of 13 μm thick having a smooth surface. In turn the coated film was subjected to a calendar processing. Subsequently, a back coating layer was formed on the side opposite to the magnetic layer with about 1 μm thick when dried using the following composition, then a video tape was prepared by slitting the coated film.

| | |
|---|---|
| BaSO$_4$ (average particle size 0.08 μm) | 80 parts by weight |
| accicular α-Fe$_2$O$_3$ (average particle size 1.0 μm) | 10 parts by weight |
| carbon black (average particle size 43 mμ) | 10 parts by weight |
| nitrocellulose | 27 parts by weight |
| polyurethane resin | 19 parts by weight |
| trifunctional low molecular isocyanite (75% by weight ethyl acetate solvent) | 11 parts by weight |
| n-butyl stearate acid | 1 parts by weight |
| myristic acid | 3 parts by weight |
| cyclohexanone | 230 parts by weight |
| toluene | 230 parts by weight |

EXAMPLE 2

A video tape was prepared in a manner similar to the example 1 except for using Cobalt containing γ-Fe$_2$O$_3$ of 83 parts by weight, CrO$_2$ with 17 parts by weight and 4.0 parts by weight of carbon black of average particle size 15 mμ with volatile constituent of 7.5% by weight.

EXAMPLE 3

A video tape was prepared in a manner similar to the example 1, except that the amount of Cobalt containing γ-Fe$_2$O$_3$ of 97 parts weight, CrO$_2$ with 3 parts by weight and 8.0 parts by weight of carbon black of average particle size 28 mμ with volatile constituent of 3.0% by weight.

EXAMPLE 4

A video tape was prepared in a manner similar to the example 1 except for using Cobalt containing γ-Fe$_2$O$_3$ of the specific surface area of 30 m$^2$/g and coercive force 650 Oe, with 90 parts by weight as the magnetic paint and CrO$_2$ of the specific surface area 30 m$^2$/g, coercive force 550 Oe of 10 parts by weight.

COMPARATIVE EXAMPLE 1

A video tape was prepared in a manner similar to the example 1 except for using 80 parts by weight of Cobalt containing γ-Fe$_2$O$_3$ and 20 parts by weight of CrO$_2$ as the magnetic paint and 3.5 parts by weight of carbon black.

COMPARATIVE EXAMPLE 2

A video tape was prepared in a manner similar to the example 1 except for using 5.5 parts by weight of the carbon black of average particle size of 24 mμ with the volatile constituent of 1.0 % by weight.

COMPARATIVE EXAMPLE 3

A video tape was prepared in a manner similar to the example 1 except for using the magnetic paint of the example 1 in which Cobalt containing γ-Fe$_2$O$_3$ of 100 parts by weight without CrO$_2$.

COMPARATIVE EXAMPLE 4

A video tape was prepared in a manner similar to the example 3 except for using 100 by weight of Cobalt containing γ-Fe$_2$O$_3$ without CrO$_2$ and using 12 parts by weight of carbon black.

COMPARATIVE EXAMPLE 5

A video tape was prepared in a manner similar to the example 2 except for using 100 parts by weight of CrO$_2$ without using Cobalt containing γ-Fe$_2$O$_3$ in the magnetic paint.

The respective video tapes were examined in a manner described below and the result thereof are shown in the table 1.

SURFACE ROUGHNESS

Average surface roughness (Ra) on the center line of each video tape was measured using a needle contact roughness meter.

LIGHT TRANSMITTANCE PROPERTY

Light of 9000 Å in wave length was applied to the test video tapes and the light passed through the test video tapes was measured by a photo sensor.

STILL PICTURE REPRODUCING PROPERTY

Using a video tape recorder (referred to as VTR) of VHS type, the respective video tapes were reproduced in the still mode and time length for the reproduced output level to be decreased 5 db from the initial state was measured.

VIDEO PROPERTY (ELECTRO-MAGNETIC CONVERSION PROPERTY) RF OUTPUT

Video signal with 50% white was recorded and reproduced on the respective video tapes using VHS VTR and the level of the FM modulated reproduced signal level was measured using an osciloscope and the result was shown as the relative value against the output level of a standard tape.

CHROMA OUTPUT

Uni color chroma signal was recorded on the respective video tapes using a VHS VTR and reproduced thereof and the level of the reproduced signal of the low frequency modulated chroma signal was measured by an osciloscope and the result was shown as the relative value against the output level of a standard recording tape.

VIDEO S/N RATIO

Video signal with 50% white was recorded on the respective video tape and reproduced thereof using a VHS VTR and noise contained in the reproduced signal was detected using a color video noise detector and converted into the S/N ratio. The result was shown as the relative value against the S/N ratio of the standard tape.

COLOR S/N RATIO

Uni color chroma signal was recorded on the respective video tapes using a VHS VTR and reproduced thereof and the level of the AM noise components in the reproduced was measured and the S/N ratio was obtained therefrom. The result was shown as the relative value against the AM noise of the standard tape.

SURFACE RESISTANCE

On a pair of electrodes each having a quadrant of a circle of 1 cm radius were juxtaposed parallel with a space equal to the width of the video tape and each of the video tapes was put on the pair of electrodes so as to contact thereto with the longitudinal direction of the video tape directed vertical to the axial direction of the electrodes and 50 N/mm$^2$ weight was loaded to both ends of the video tape. 500 volt was applied to the electrodes so as to measure the surface resistance of the video tape.

The result of the measurements is shown in the table 1.

The video tapes with more than 20% by weight of $CrO_2$ such as the comparative example 1 or comparative example 5 in which only $CrO_2$ is used show a low video output and a bad still picture property due to a large surface roughness of the magnetic layer caused by the low dispersibility of $CrO_2$.

The video tape with less than 3.0% by weight of the volatile constituent in the carbon black (comparative example 2) shows a low video output characteristic and insufficient still picture output due to a large surface roughness of the magnetic layer.

The video tape of the comparative example 3 using only Co containing $\gamma$-$Fe_2O_3$ shows a high light transmittance in such a degree that the video tape can not run in the VHS VTR.

The video tape of the comparative example 4 using only Co containing $\gamma$-$Fe_2O_3$ as the magnetic material and increased amount of the carbon black in the magnetic layer for decreasing the light transmittance shows a low video output property and a bad stil property due to the rough surface of the magnetic layer.

While the video tapes of the examples 1 to 4 according to the present invention in which the magnetic material is composed of Cobalt containing $\gamma$-$Fe_2O_3$ and $CrO_2$ within the range more than 3% by weight to less than 20% by weight in the magnetic powder and the magnetic layer contains carbon black with more than 3% by weight volatile constituent show respectively a low light transmittance with the fine surface smoothness of the magnetic layer, whereby the video properties are superior to or equal to the video tape of the comparative example 3 using Cobalt containing $\gamma$-$Fe_2O_3$ as the magnetic powder and have a good still picture reproducing property. Also the surface resistivity is low because of carbon black in the magnetic layer and the residual magnetic flux density is high.

TABLE 1

|  | examples | | | | comparative examples | | | | |
| --- | --- | --- | --- | --- | --- | --- | --- | --- | --- |
|  | 1 | 2 | 3 | 4 | 1 | 2 | 3 | 4 | 5 |
| surface roughness of the magnetic layer μm | 0.006 | 0.008 | 0.005 | 0.005 | 0.010 | 0.012 | 0.004 | 0.010 | 0.018 |
| light transmittance (%) | 0.02 | 0.01 | 0.05 | less than 0.01 | less than 0.01 | 0.03 | 0.200 | 0.04 | 0 |
| still picture reproducing characteristics (hours) | more than 2.0 | more than 2.0 | more than 2.0 | more than 2.0 | 1.0 | 1.5 | more than 2.0 | 0.5 | 0.5 |
| magnetic property |  |  |  |  |  |  |  |  |  |
| coercive force; Hc (Ce) | 690 | 670 | 706 | 700 | 660 | 690 | 698 | 701 | 590 |
| residual magnetic flux density Br (gauss) | 1,430 | 1,500 | 1,400 | 1,550 | 1,546 | 1,320 | 1,290 | 1,220 | 1,680 |
| saturation magnetic flux density Bm (gauss) | 1,722 | 1,830 | 1,720 | 1,867 | 1,907 | 1,714 | 1,675 | 1,718 | 1,975 |
| squareness ratio Br/Bm | 0.81 | 0.82 | 0.79 | 0.83 | 0.81 | 0.77 | 0.77 | 0.71 | 0.85 |
| video property |  |  |  |  |  |  |  |  |  |
| RF output (dB) | +0.3 | +0.8 | +0.2 | +0.8 | −0.2 | −1.2 | −0.3 | −1.0 | −1.2 |
| chroma output (dB) | +0.5 | +1.0 | +0.2 | +1.0 | −0.5 | −1.0 | +0.1 | −1.0 | +0.1 |
| video S/N (dB) | +3.5 | +3.3 | +3.5 | +3.1 | +2.5 | +1.8 | +3.4 | +2.1 | +1.5 |
| colar S/N (dB) | +4.6 | +4.5 | +4.8 | +4.0 | +3.5 | +2.5 | +4.6 | +2.0 | +1.9 |
| surface resistance (Ω/sq) | $2.0 \times 10^9$ | $1.2 \times 10^9$ | $5.0 \times 10^9$ | $9.0 \times 10^8$ | $9.2 \times 10^8$ | $1.0 \times 10^9$ | $1.2 \times 10^{10}$ | $8.1 \times 10^8$ | $2.5 \times 10^8$ |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a magnetic layer, including a magnetic powder, and carbon black, said magnetic powder being comprised of:

iron oxide magnetic powder with more than 30 $m^2/g$ specific surface area measured by BET method, and chromium dioxide ($CrO_2$) magnetic powder with more than 30 $m^2/g$ specific surface area measured by BET method and in an amount being within a range of more than 3% to less than 20% by weight in the total amount of the iron oxide powder and the chromium dioxide powder, said carbon black having a volatile constituent of more than 3% by weight.

2. The magnetic recording medium of claim 1, wherein said volatile constituent is an oxygen containing group of at least one member selected from the group consisting of carboxyl, quinone, phenol and lactone.

3. The magnetic recording medium of claim 1, wherein the average particle size of the carbon black is within a range of from about 10 to 70 m$\mu$.

4. The magnetic recording medium of claim 1, wherein the carbon black is present in an amount of from 1 to 10 parts by weight for the total amount of the iron oxide powder and the chromium dioxide powder.

5. The magnetic recording medium of claim 1, wherein the specific surface area of the chromium dioxide is in the range of from about 30 to 60 $m^2/g$.

6. The magnetic recording medium of claim 1, wherein said chromium dioxide powder is in a range of from 5 to 15% by weight for the total amount of the iron oxide powder and the chromium dioxide powder.

7. The magnetic recording medium of claim 1, wherein said magnetic layer is from about 3 to 10 $\mu$m thick.

* * * * *